Oct. 30, 1934. J. Y. DREISONSTOK ET AL 1,978,417
PARALLEL MOTION DEVICE
Filed March 2, 1932 3 Sheets-Sheet 1
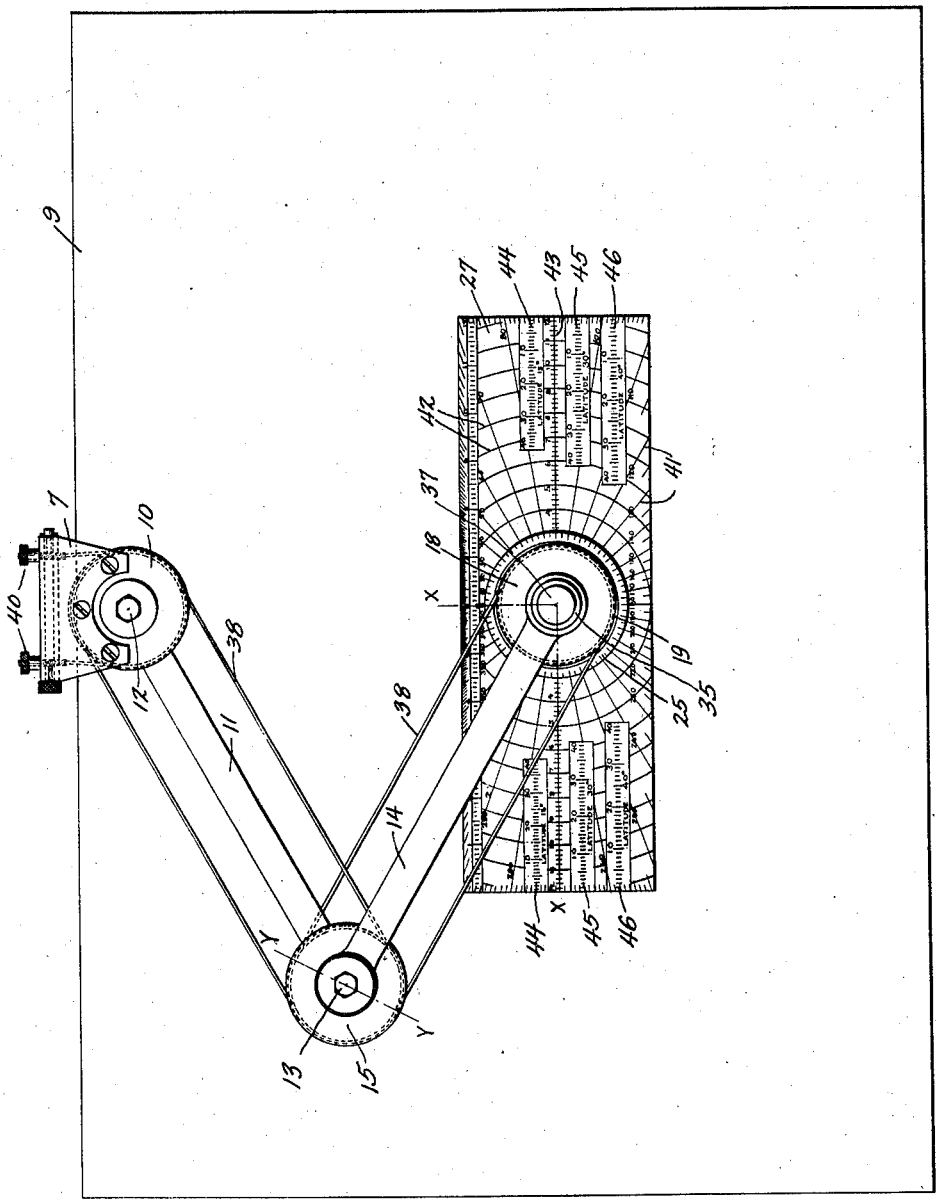
FIG. I.
INVENTORS
JOSEPH Y. DREISONSTOK
EDWARD J AIKEN
BY EDSON B BALDWIN
ATTORNEY Oct. 30, 1934.    J. Y. DREISONSTOK ET AL    1,978,417
PARALLEL MOTION DEVICE
Filed March 2, 1932    3 Sheets-Sheet 2
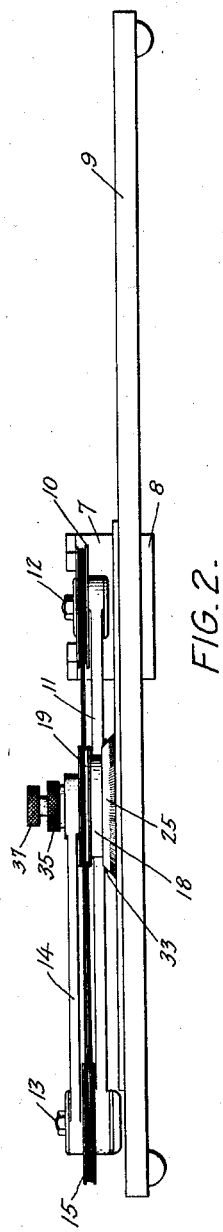
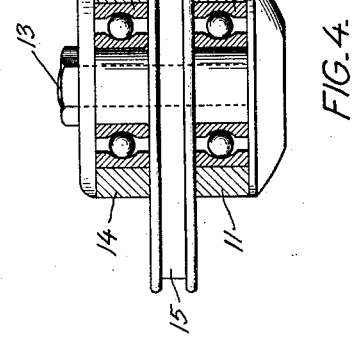
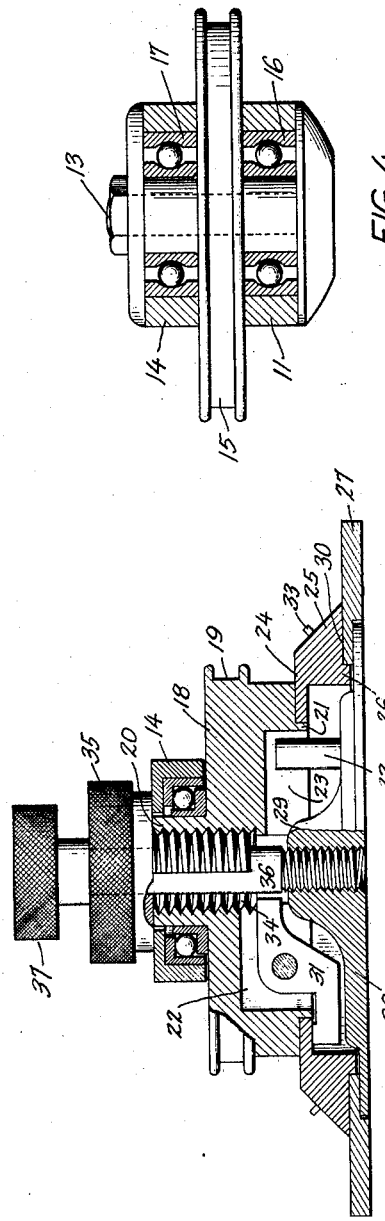
INVENTORS
JOSEPH Y. DREISONSTOK
EDWARD J. AIKEN
BY   EDSON B. BALDWIN
ATTORNEY Oct. 30, 1934.   J. Y. DREISONSTOK ET AL   1,978,417
PARALLEL MOTION DEVICE
Filed March 2, 1932   3 Sheets-Sheet 3
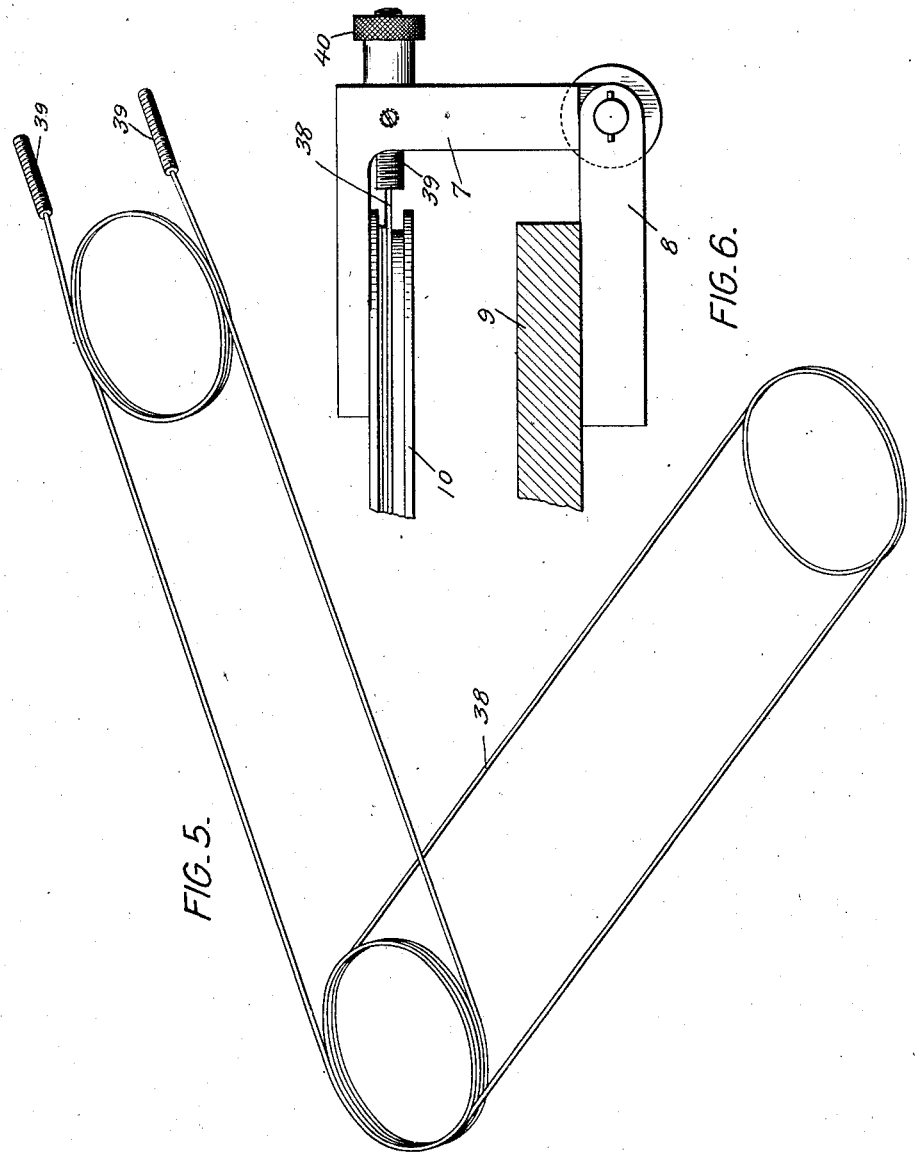
INVENTORS
JOSEPH Y. DREISONSTOK
EDWARD J. AIKEN
BY EDSON B. BALDWIN
ATTORNEY Patented Oct. 30, 1934

1,978,417

UNITED STATES PATENT OFFICE

1,978,417

PARALLEL MOTION DEVICE

Joseph Y. Dreisonstok, United States Navy, Washington, D. C., and Edward J. Aiken and Edson B. Baldwin, Washington, D. C.

Application March 2, 1932, Serial No. 596,307

13 Claims. (Cl. 33—79)

(Granted under the act of March 3, 1883, as amended April 30, 1928; 370 O. G. 757)

This invention relates to an instrument for drawing and plotting and especially to such an instrument in which an element is movable parallel to itself.

It is the object of our invention to provide a device of the kind specified that will be simple in construction, accurate in operation, and adaptable to a wide variety of uses.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a plan view of our invention mounted on a board;

Fig. 2 is a side elevation thereof;

Fig. 3 is a section on line X—X of Fig. 1;

Fig. 4 is a detail of the mounting of one of the sheaves on line Y—Y of Fig. 1;

Fig. 5 is a view showing the disposition of the flexible paralleling member;

Fig. 6 shows the manner of mounting the device on the board and the means for adjusting the actuating member.

Bracket 7 is pivotally mounted between the limbs of a bifurcated member 8 secured to the lower surface of a drawing or plotting board 9. Sheave 10 is non-rotatably fixed to one arm of bracket 7. Arm 11 has a bearing aperture at each end, one of which is mounted with anti-friction bearings upon a pin 12 that extends through a central aperture in sheave 10. Pin 13 passes through the other bearing aperture of arm 11, through a like aperture in arm 14, and through a sheave 15 disposed between the two arms, the anti-friction bearings 16 and 17 being mounted in the arms 11 and 14, respectively.

The adjusting head carried by the other end of arm 14 comprises a head member 18 having on its periphery a sheave 19 and a threaded centrally disposed boss 20, an annular flange 21 on its lower face, a pair of diametrically oppositely disposed slots 22 and a second pair of like disposed slots 23. A dial 24 having a sloping face 25 calibrated in degrees of arc is rotatably mounted on flange 21 against the lower face of member 18 and has an annular flange 26 on its lower face on which the scale 27 of celluloid or like material is rotatable. A clamping disk 28 with a threaded central boss 29 has its outer edge disposed in a cut away portion 30 on the under face of scale 27. Bell crank clamps 31 are pivoted with the outer end of each movable against dial 24 in each of the slots 22. Pin 32 on disk 28 may be disposed in either of the slots 23 to prevent rotation of disk 28 with scale 27. Pins 33 projecting from face 25 of dial 24 afford means for applying force to the dial to rotate it. Axially bored screw 34 has a knurled head 35 and is engaged with the threads in boss 20 with its lower end contacting the inner ends of clamps 31 and screw 36 with knurled head 37 passes through the bore of screw 34 to engage the threads of boss 29. When screw 34 is tightened down the outer ends of clamps 31 are forced against dial 24 which locks the dial against rotation, and tightening screw 36 clamps scale 27 between disk 28 and dial 24.

A flexible paralleling member 38 of piano wire or the like having a threaded adjusting tip 39 on each end is passed more than once around each of the sheaves 10, 15, and 19 to prevent slipping and the ends are adjustably secured to bracket 7 by nuts 40 screwed on tips 39. It will be seen that when the position of either one or both of arms 11 and 14 is changed the relative movement therebetween will cause member 38 to wind up on one side of one or more of the sheaves and to unwind from the opposite side in such manner that the adjusting head is rotated so the position of 27 always remains parallel to the position occupied at the beginning of the movement provided the scale and the dial are locked. For example, if scale 27 be moved toward the upper right hand corner of board 9 the rotation of arm 11 about pin 12 will unwind 38 from the right hand side of sheave 10 and winds it on the left hand side thereof, and inasmuch as sheave 10 is fixed sheave 10 is given a clockwise rotation which is imparted to sheave 19 and so to scale 27. It should be mentioned that the sheaves are all of the same diameter and therefore the movements of all of them with respect to member 38 are equal and the angular change of sheave 19 with respect to arms 14 and 11 is at all times equal to the angular change of those arms with respect to pin 12. Arm 14 may be rotated about pin 13 while arm 11 remains fixed, in which case the rotation of sheave 19 and scale 27 fixed thereto is equal to the angular movement of arm 14 about pin 13. Absolute equality of movement is secured by winding member 38 more than once on each sheave whereby any slippage of member 38 on the sheave is prevented. The tension on member 38 is adjusted by means of nuts 40.

Both dial 24 and scale 27 may be released to be freely rotatable with respect to each other and with respect to member 18 by loosening screws 34 and 36. After the dial and scale have been moved to any desired relative positions they may be locked in that relation by tightening both of screws 34 and 36 or the dial 24 may be locked and scale 27 left free. It is obvious that this flexibility of adjustment adapts the instrument to a wide variety of uses.

In addition to radially extending protractor divisions 41 and uniformly spaced concentric markings 42, scale 27 is provided with longitudinal calibration marks 43 (in the present instance ten to the inch) and calibrations 44, 45 and 46 scaled for use in navigating adjacent latitudes 15°, 30°, and 40° respectively.

The freedom of movement of the scale 27 and the several calibrations thereon make dividers unnecessary for the solution of any of the ordinary problems of navigation.

The articulation of the members is such that any part of board 9 may be reached with scale 27, thus eliminating "dead" spots. The instrument as a whole may be moved on the pivotal mounting between bracket 7 and member 8 and swung clear of the board for placing charts or paper on the board or working thereon with other instruments.

While the description has been directed to the use of the present invention as a navigational instrument it is obvious that it is adapted for any use requiring parallel motion, as on drafting machines, pantogravers, engraving machines, etc.

It will be understood that the above description and accompanying drawings comprehend only the general and preferred embodiment of our invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalty thereon.

We claim:

1. A parallel motion device, comprising a pivotally mounted bracket, a sheave fixed thereto, a first arm having one end connected to said sheave to pivot about the center thereof, a second arm having one end pivotally connected to the other end of said first arm, a second sheave rotatably mounted at the junction of said arms; a centrally bored and threaded head member having a sheave formed on its periphery, an annular flange projecting from its lower face, and a plurality of radially extending slots in its lower face; a dial rotatable on said flange, said dial having a sloping peripheral face calibrated in degrees of arc and an annular flange projecting from its lower face; a scale rotatable on the flange on said dial, a centrally bored and threaded clamping disk with its outer edge disposed to clamp said scale against said dial, a pin on said disk disposed in one of the slots in said member, an axially bored screw engaged with said head member, pivoted clamping levers in some of said radial slots disposed to have one end of each contacted by said screw and the other end of each movable thereby against said dial to clamp it against said head member, a second screw passing through the first screw and engaging said disk, a single flexible member passed more than once around each of said sheaves, threaded tips on the ends of said flexible member passing through said bracket, and nuts engageable with said tips to tension said flexible member.

2. A parallel motion device, comprising a bracket, a sheave non-rotatably fixed thereto, a first arm having one end pivotally connected to said sheave, a second arm pivoted to the other end of said arm, a second sheave mounted at the junction of said arms, a head member pivotally mounted at the free end of said second arm, said member having a sheave formed on its periphery, and an annular flange projecting from the under face thereof, a flexible member passed more than once around each of said sheaves and having its ends secured to said bracket, a dial rotatable on said flange and having an annular flange on its under face, a scale rotatable on the flange on said dial, a disk disposed to clamp said scale against said dial, a hollow screw engaged with said member, pivoted clamping levers mounted in said member and disposed to have one end contacted by said screw and the other end disposed to clamp said dial, and a second screw passing through said hollow screw and engaging said disk.

3. A parallel motion device, comprising a bracket, a sheave non-rotatably fixed thereto, a first arm having one end pivotally connected to said sheave, a second arm pivoted to the other end of said arm, a second sheave mounted at the junction of said arms, a head member pivotally mounted at the free end of said second arm, said member having a sheave formed on its periphery and an annular flange projecting from the under face thereof, a flexible member passed more than once around each of said sheaves and having its ends secured to said bracket, a dial rotatable on said flange and having an annular flange on its under face, a scale rotatable on the flange on said dial, means for clamping said scale against said dial, and means for clamping said dial against rotation independently of the first mentioned clamping means.

4. A parallel motion device, comprising a supporting member, a sheave fixed thereto, an arm pivoted to said sheave, a second arm pivoted to said first arm, a sheave at the junction of said arms, a head member pivotally mounted in said second arm, said member having an annular flange on its lower face and a sheave formed on its periphery, a dial rotatable on said flange and having an annular flange on its lower face, a scale rotatable on the flange on said dial, a hollow screw threaded into said member, clamping levers pivotally mounted in said member actuatable by said screw to clamp said dial against rotation, a disk disposed to clamp said scale against said dial, a second screw passing through said hollow screw to engage said disk, and a single flexible member passed more than once around each of said sheaves.

5. A parallel motion device, comprising a supporting member, a sheave fixed thereto, an arm pivoted to said sheave, a second arm pivoted to said first arm, a sheave at the junction of said arms, a head member pivotally mounted in said second arm, said member having an annular flange on its lower face and a sheave formed on its periphery, a dial rotatable on said flange and having an annular flange on its lower face, a scale rotatable on the flange on said dial, a hollow screw threaded into said member, clamping levers pivotally mounted in said member actuatable by said screw to clamp said dial against rotation, a disk disposed to clamp said scale against said dial, a second screw passing through said hollow screw to engage said disk and flexible means passed around said sheaves in driving contact therewith.

6. In a parallel motion device, pivotally connected members, an adjusting head rotatably mounted in one of said members, said head comprising a head member having an annular flange on its lower face, a dial rotatable on said flange, said dial having an annular flange on its lower face, a scale rotatable on said annular flange on said dial, a disk disposed to clamp said scale against said dial, a hollow screw threaded into said head member, clamping levers mounted in said head member actuatable by said screw to clamp said dial against said head member, a second screw passing through said hollow screw to engage said disk to clamp said scale against said dial, and means cooperating with the pivotally connected members to impart to said head angular movement equal to the combined angular movement of all said pivotally connected members to maintain the scale in parallelism with the position in which it is placed by setting said head.

7. In a parallel motion device, pivotally connected members, an adjusting head rotatably mounted in one of said members, said head comprising a head member having an annular flange on its lower face, a dial rotatable on said flange, said dial having an annular flange on its lower face, a scale rotatable on said annular flange on said dial, a disk disposed to clamp said scale against said dial, means to clamp said dial against said head member, independently acting means to move said disk to clamp said scale against said dial, and means cooperating with the pivotally connected members to impart to said head angular movement equal to the combined angular movement of all said pivotally connected members to maintain the scale in parallelism with the position in which it is placed by setting said head.

8. In a parallel motion device, pivotally connected arms, a bracket to which one of said arms is pivotally connected, an adjusting head pivotally mounted in the other of said arms, said head comprising a sheave, a second sheave secured to said bracket, a third sheave rotatably mounted at the junction of said arms, and a flexible member passed more than once around each of said sheaves and having its ends connected to said bracket.

9. In a device of the class described, a centrally bored and threaded head member having a plurality of radially extending slots in its lower face, an annular flange projecting from its lower face, a dial rotatable on said flange, said dial having a sloping peripheral face calibrated in degrees of arc and an annular flange projecting from its lower face, a scale rotatable on the flange on said dial, a centrally bored and threaded clamping disk with its outer edge disposed to clamp said scale against said dial, a pin on said disk disposed on one of the slots in said member, an axially bored screw engaged with said head member, pivoted clamping levers in some of said radial slots disposed to have one end of said lever contacted by said screw and the other end of each lever movable thereby against said dial to clamp said dial against said head member, and a second screw passing through the first screw and engaging said disk for clamping said scale to said dial.

10. In a device of the class described, a head member having an annular flange projecting from the under face thereof, a dial rotatable on said flange and having an annular flange on its under face, a scale rotatable on the flange on said dial, a disk disposed to clamp said scale against said dial, a hollow screw engaged with said member, pivoted clamping levers mounted in said member and disposed to have one end of each lever contacted by said screw and the other end disposed to clamp against said dial, and a second screw passing through said hollow screw and engaging said disk.

11. In a device of the class described, a supporting element, a head member pivotally mounted in said support, said member having an annular flange projecting from the under face thereof, a dial rotatable on said flange and having an annular flange on its under face, a scale rotatable on the flange on said dial, means for clamping said scale against said dial, and means for clamping said dial against said head member independently of the first mentioned clamping means.

12. In a device of the class described, a head member pivotally mounted in a support and having an annular flange on its lower face, a dial rotatable on said flange and having an annular flange on its lower face, a scale rotatable on the flange on said dial, a hollow screw threaded into said member, clamping levers pivotally mounted in said member to be actuatable by said screw to clamp said dial to said member, a disk disposed to clamp said scale against said dial and a second screw passing through said hollow screw to engage said disk.

13. In a device of the class described, a connecting member, a head pivotally mounted in said member, said head having a flange on its lower face, a dial rotatable on said flange and having an annular flange on its lower face, a scale rotatable on the flange on said dial, means to lock said dial to said head, and means separately to lock said scale to said dial.

JOSEPH Y. DREISONSTOK.
EDWARD J. AIKEN.
EDSON B. BALDWIN.